United States Patent [19]

Neumaier

[11] Patent Number: 5,111,889

[45] Date of Patent: May 12, 1992

[54] DRILLING TOOL SPEED SHIFTING UNIT

[75] Inventor: Anton Neumaier, Fürstenfeldbruck, Fed. Rep. of Germany

[73] Assignee: Hilti Aktiengesellschaft, Fürstentum, Liechtenstein

[21] Appl. No.: 674,564

[22] Filed: Mar. 25, 1991

[30] Foreign Application Priority Data

Mar. 29, 1990 [DE] Fed. Rep. of Germany ....... 4010037

[51] Int. Cl.⁵ .............................................. B23B 45/02
[52] U.S. Cl. ...................................... 173/48; 173/117; 74/531
[58] Field of Search .......................... 173/48, 109, 117; 74/531

[56] References Cited

U.S. PATENT DOCUMENTS

| | | | |
|---|---|---|---|
| 3,774,699 | 11/1973 | Schmuck | 173/48 |
| 3,834,468 | 9/1974 | Hettich et al. | 173/48 |
| 3,931,744 | 1/1976 | Wunsch | 173/48 |
| 4,236,588 | 12/1980 | Möldan et al. | 173/48 |
| 4,506,743 | 3/1985 | Grossmann | 173/48 |

Primary Examiner—Frank T. Yost
Assistant Examiner—Scott A. Smith
Attorney, Agent, or Firm—Toren, McGeady & Associates

[57] ABSTRACT

A drilling tool has a shifting unit including a rotatable shifting lever (6) with a shifting cam (9) for switching between different operating positions corresponding to different operating speeds. For holding the shifting lever (6) in the operating positions, a spring clip (14) is mounted on the lever and is rotatable relative to the tool housing. The spring clip has detents (14a, 14b) arranged to snap into recesses (1d, 1e) in a bolt-like part of the housing which rotationally supports the shifting lever (6).

4 Claims, 2 Drawing Sheets

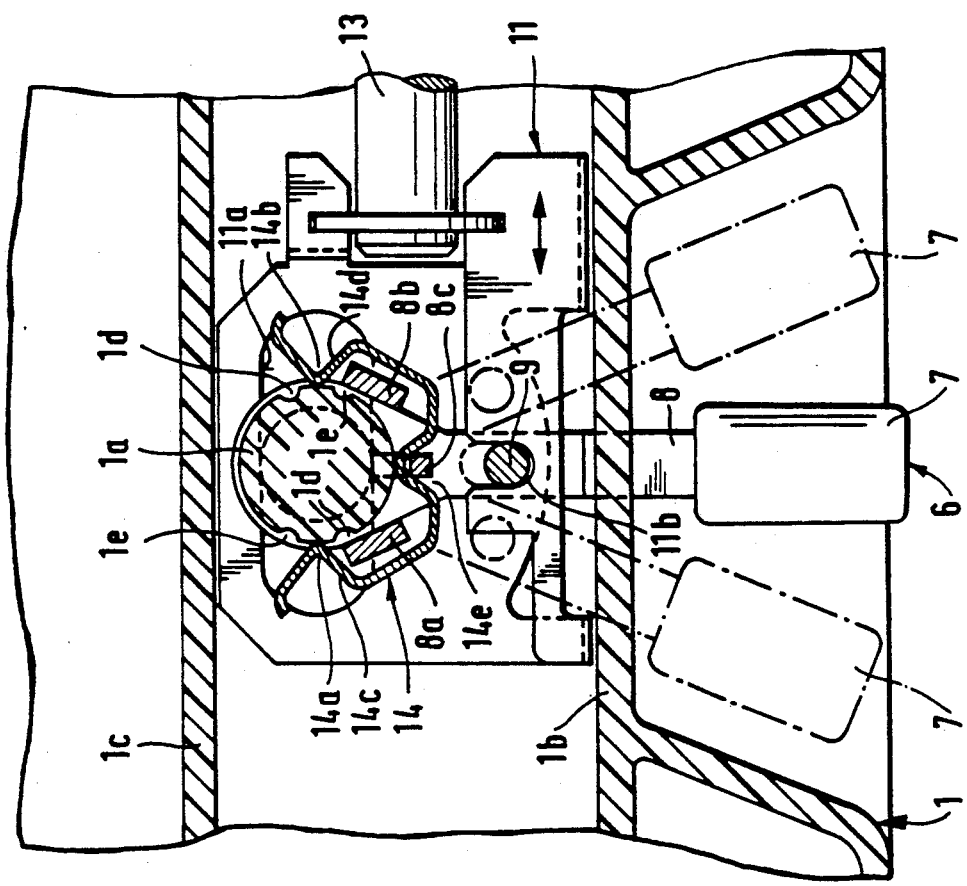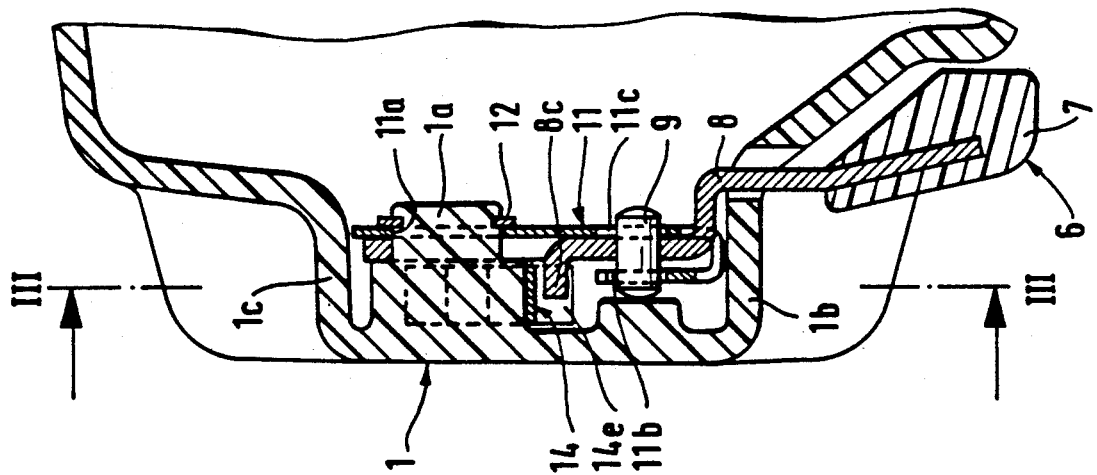

DRILLING TOOL SPEED SHIFTING UNIT

BACKGROUND OF THE INVENTION

The present invention is directed to a drilling tool with a shifting unit for selection of the tool operating speed The shifting unit includes a shifting lever rotatable into different operational positions relative to the tool housing and equipped with shifting cams for the shifting unit and a spring clip with detents capable of snapping into detent recesses in the different operational positions.

A drilling device with a rotatable switching knob for selecting different operating speeds is known from DE-OS 32 40 466 with the switching knob being retained in the operational positions by a spring clip fixed in the housing of the device, so that the spring clip can snap into detent recesses in the rotatable knob.

The force to be applied to the switching knob is determined by the force of the spring. In the known device it is noted that the spring force depends largely on the manner in which the spring clip is secured to the device housing. Depending on the manner in which the spring clip is secured, different switching forces develop. The manner in which the spring clip is clamped is a source of problems with regard to the way in which the spring force is influenced.

SUMMARY OF THE INVENTION

The primary object of the present invention is to provide a drilling tool with a lever of simple construction which is easy to manipulate for switching between different tool operational conditions, wherein the shifting force for the lever, independent of the retention of the spring clip, is assured.

In accordance with the present invention, the spring clip is rotatable by the lever relative to the tool housing and is secured in operating positions by detent recesses in the housing.

The present invention permits the elimination of means for the fixed clamping of the spring clip. The spring clip, rotatable relative to the tool housing, is not affected by external influences, such as the type of installation, the type of fabrication, or the like as far as its spring forces are concerned, so that a shifting force, independent of the retention of the spring clip, is achieved.

Preferably, the detent recesses are located in a bolt-like part of the housing. Advantageously, the spring clip is rotatable around the bolt-like part. As a result, the bolt-like part serving as a rotational bearing for the spring clip, can be partially embraced with prestress by the spring clip. This arrangement affords a simple retention of the spring clip.

In a preferred arrangement, the spring clip snaps into the bolt-like part at two locations, by providing pairs of diametrically opposite detent recesses for detents adjacent the ends of the spring clip for locating the operational positions. The individual pairs of the detent recesses are arranged angularly offset relative to one another to afford the required shifting or switching travel.

To achieve rotationally locked engagement with the lever, driving shoulders cooperating with the lever are preferably made part of the spring clip. Driving or engagement cams are provided on the lever for engaging the driving shoulders. The driving shoulders are formed by wall portions of a shaped section of the spring clip with the driving cams engageable with the shoulders. With this arrangement, rotary motion in both directions of rotation of the spring clip can be effected.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 2 is an enlarged sectional view of the drilling tool taken along the line II—II in FIG. 1; and FIG. 3 is a sectional view taken along the line III—III in FIG. 2.

DETAILED DESCRIPTION OF THE INVENTION

Figure 1:
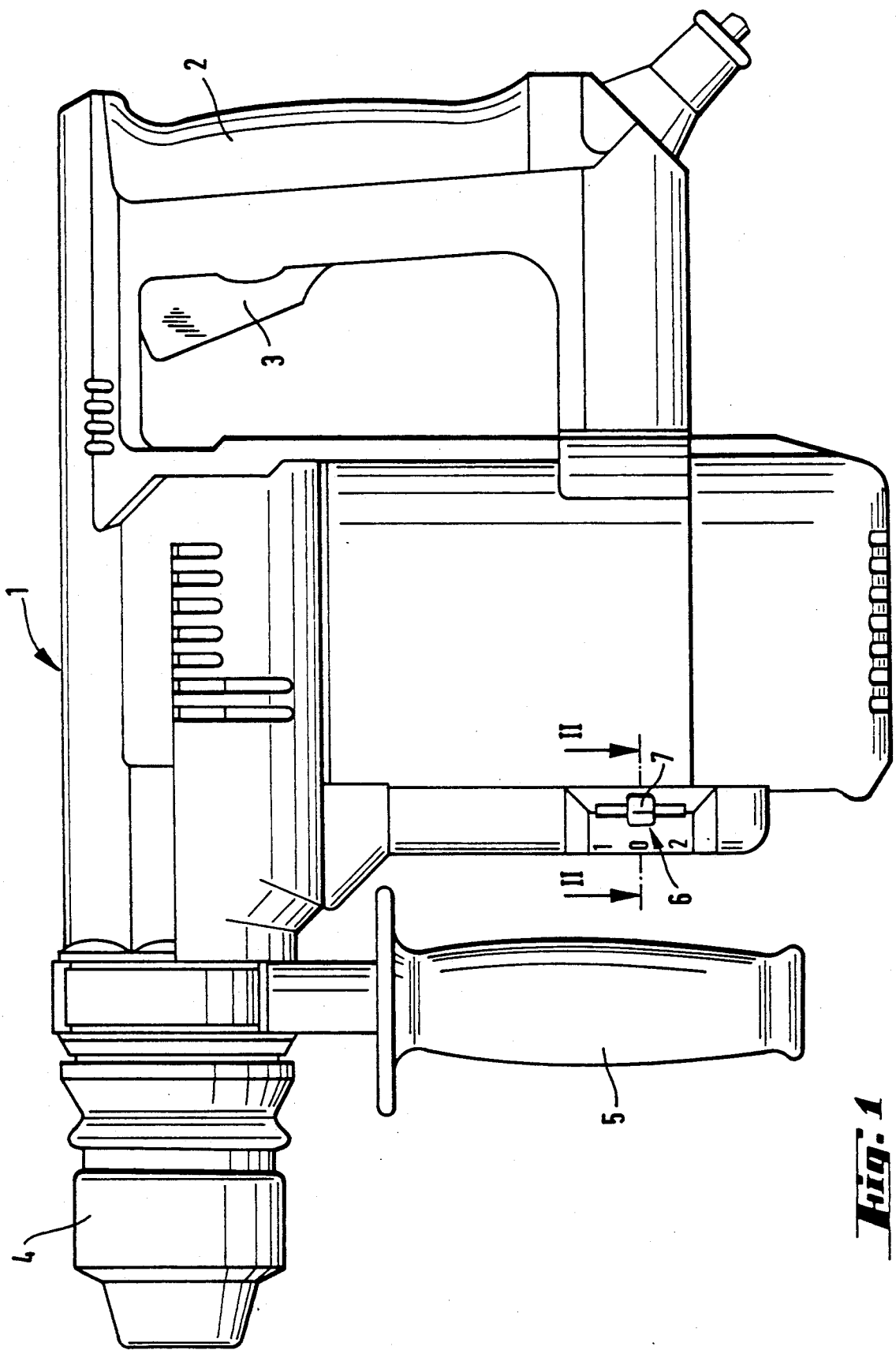
FIG. 1 is a side view of a drilling tool embodying the present invention.

In FIG. 1, a drilling tool is shown comprising a tool housing 1 with a handle 2 at the right hand end. A trigger or switch 3 for operating an electric motor within the tool housing 1, is located in the handle 2. In addition, a mechanical shifting unit is located in the tool housing 1 so that different operational speeds can be imparted to a tool bit receptacle 4 at the left hand end of the housing. The tool housing 1 has a leading end on the left hand side and a trailing end at the right hand or handle end of the housing. A side grip 5 extends downwardly from the tool housing 1 at its leading end adjacent to the tool bit receptacle 4. The shifting unit include a lever 6 accessible on the outside of the tool housing 1 for movement into two operating positions "1", "2" for driving the tool bit receptacle 4 at different speeds. Between the operating positions, there is a middle position "0" and when the lever is in this position the rotation of the tool bit receptacle 4 is interrupted. The middle position "0" represents the transitional position between the two operating positions "1" "2" which represent the two different speeds.

As illustrated in FIGS. 2 and 3, the lever 6 has a gripping member 7 located outside the tool housing 1 and an arm 8 rigidly connected with the gripping member and extending through the housing into its interior. Arm 8 is rotationally supported on a bolt-like part 1a formed integrally with and located inside the housing 1. The axis of the bolt-like part 1a forms the axis of rotation for the arm 8. Spaced radially outwardly from the axis of rotation of the arm 8 are a pair of driving cams 8a, 8b, each arranged symmetrically relative to one another about a plane extending parallel to the axis of rotation and through the center line of the arm 8. These cams 8a, 8b extend parallel to the axis of rotation in the leading end-trailing end direction of the housing 1. In addition, a support tap 8c is provided on the arm 8 located between the driving cams 8a, 8b. Spaced below the support tap 8c as viewed in FIGS. 2 and 3, a bolt or pin shaped shifting cam 9 extends parallel to the axis of rotation and is spaced radially from the support 8c tap. The cam 9 extends completely through the arm and protrudes from both sides of the arm.

Shifting cam 9 displaces a slide 11 transversely of the axis of rotation. Slide 11 is a shaped sheet-metal plate part guided between the side walls 1b, 1c of the tool housing 1, and also by the bolt-like part 1a which extends through an elongated hole 11a in the slide, note FIG. 3. Slide 3 is held on the bolt-like part 1a by a circlip 12, note FIG. 2. Two elongated openings 11b, 11c are formed in the slide for entrainment or driving engagement with the shifting cam 9. Note in FIG. 2 that the cam 9, extending from the opposite sides of the arm 8 projects through the two openings 11b, 11c. The displacement of the slide is transmitted to a shifting rod 13 positioned in the slide 11 and coupled to it in a known manner, note FIG. 3.

The shifting lever 6 can be secured in the operating positions "1" and "2". A spring clip 14 holds the shifting lever 6 in the desired position. Spring clip 14 is symmetrically shaped relative to the center line of the arm 8 passing through the axis of rotation of the bolt-like part 1a. The spring clip, adjacent its opposite ends, has detents 14a, 14b which engage the outer peripheral surface of the bolt-like part 1a with a prestress. Pairs of snap-in recesses 1d, 1e are provided in the outer peripheral surface of the bolt-like part 1a, so that the detents 14a, 14b snap into the recesses 1d, 1e for securing the lever in the desired operating position. Accordingly, spring clip 14 is rotated on the bolt-like part 1a by the shifting lever 6 and the driving cams 8a, 8b rotational displace the spring clip into the desired operating position. One of the driving cams 8a, 8b, during rotational movement, engages one of the entrainment shoulders 14c, 14d, so that the spring clip is rotated about the axis of rotation of the bolt-like part 1a with its detents 14a, 14d snapping into the desired pair of recesses 1d, 1e. The support tap 8c fits into a recess (14e formed by a V-shaped part of the spring clip and prevents radial displacement of the spring clip from the bolt-like part 1a. In FIG. 3 the two operating positions "1" and "2" of the shifting lever are displayed in dot dash lines. Further, in FIG. 3 the lever 6, shown in full line, is located between the two operating positions.

I claim:

1. Drilling tool comprising a shifting unit including a shifting lever (6) with shifting cam means (9) for switching between different operating speeds of the drilling tool, said shifting lever (6) being rotatably displaceable between different operating positions relative to a tool housing (1), a spring clip (14) mounted on said shifting lever, said spring clip comprising detent means (14a, 14b) for engagement in recesses (1d, 1e) defining operating positions of the lever (6), wherein the improvement comprises that said spring clip (14) is rotatable by said shifting lever (6) relative to said tool housing (1), said spring clip (14) is a shaped member with said detent means (14a, 14b) comprising a pair of detents (14a, 14b) located substantially diagonally opposite one another adjacent opposite ends of said spring clip, said recesses (1d, 1e) are formed in said housing and comprise two pairs of said recesses (1d, 1e) with each pair located diagonally opposite one another on a part (1a) of said housing.

said pairs of recesses (1d, 1d, 1e, 1e) are formed in said part and said part is a bolt-like part (1a) formed by said tool housing (1) in the interior thereof, said spring clip (14) is in engagement with and is rotatable around a circular surface of said bolt-like part (1a), said detents (14a, 14b) in said spring clip are located on diametrically opposite sides of an axis of rotation formed by said bolt-like part, and said two pair of recesses (1d, 1d, 1e, 1e) arranged diametrically opposite one another in the circular surface of said bolt-like part (1a) for defining the operating positions of the drilling tool, said spring clip (14) comprises driving shoulders (14c, 14d) extending outwardly from said detents (14a, 14b) relative to said bolt-like part (1a) and arranged to cooperate with said shifting lever (6) for rotationally displacing said spring clip, so that said detents (14a, 14b) selectively engage one of said pairs of recesses (1d, 1d, 1e, 1e) for securing said shifting lever (6) in an operating position, said shifting lever (6) comprises a gripping member (7) located on the exterior of said tool housing (1) and an elongated arm (8) secured on the outside of said tool housing to said gripping member (7) and extending through an opening in said tool housing into the interior of said housing and rotationally mounted on said bolt-like part (1a), and means (8c) on said arm (8) for holding said spring clip (14) on said bolt-like part (1a) during rotational movement of said lever (6) relative to said bolt-like part (1a).

2. Drilling tool, as set forth in claim 1, wherein a pin shaped shifting cam (9) is secured to said arm (8) and engages a slide (11) within said tool housing (1) for moving said slide transversely of the axis of rotation.

3. Drilling tool, as set forth in claim 2, wherein said shifting cam (9) engages said slide in an elongated opening (11b) in said slide whereby said cam moves relative to said opening in rotational movement between the operating positions of the drilling tool.

4. Drilling as set forth in claim 3, wherein said slide (11) is a sheet metal plate-like part bent so that it extends on opposite sides of said arm (8) and has an elongated hole (11a) through which said bolt-like part (1a) of said housing extends.

* * * * *